US010260367B2

(12) United States Patent
Haskin (10) Patent No.: US 10,260,367 B2
(45) Date of Patent: Apr. 16, 2019

(54) POWER TRANSMISSION SYSTEM FOR TURBINES OR COMPRESSORS HAVING COUNTER-ROTATING BLADES (71) Applicant: Jay Haskin, Bryan, TX (US)

(72) Inventor: Jay Haskin, Bryan, TX (US)

(*) Notice: Subject to any disclaimer, the term of this patent is extended or adjusted under 35 U.S.C. 154(b) by 58 days.

(21) Appl. No.: 15/678,769

(22) Filed: Aug. 16, 2017

(65) Prior Publication Data

US 2018/0119562 A1  May 3, 2018

Related U.S. Application Data (63) Continuation-in-part of application No. 15/341,628, filed on Nov. 2, 2016, now Pat. No. 9,745,860.

(51) Int. Cl.
F01D 15/12 (2006.01)
F01D 5/02 (2006.01)
F01D 25/16 (2006.01)
F01D 1/24 (2006.01)
F04D 19/02 (2006.01)
F02C 3/067 (2006.01)
F02C 7/36 (2006.01)

(52) U.S. Cl.
CPC .............. F01D 15/12 (2013.01); F01D 1/24 (2013.01); F01D 5/02 (2013.01); F01D 25/162 (2013.01); F02C 3/067 (2013.01); F02C 7/36 (2013.01); F04D 19/024 (2013.01); F05D 2220/32 (2013.01); F05D 2240/52 (2013.01); F05D 2260/4021 (2013.01); F05D 2260/4031 (2013.01); Y02E 20/14 (2013.01)

(58) Field of Classification Search
CPC ........ F01D 15/12; F01D 25/162; F02C 3/067; F02C 7/36
See application file for complete search history.

(56) References Cited

U.S. PATENT DOCUMENTS

| 3,524,318 | A | 8/1970 | Bauger et al. |
| 3,673,802 | A | 7/1972 | Krebs et al. |
| 4,159,624 | A | 7/1979 | Gruner |
| 4,192,137 | A * | 3/1980 | Chappell ................... F01D 5/03 415/65 |
| 4,648,788 | A | 3/1987 | Jochum |
| 4,790,133 | A | 12/1988 | Stuart |
| 4,860,537 | A | 8/1989 | Taylor |

(Continued)

OTHER PUBLICATIONS

International Search Report as to PCT/US2017/057142, which claims priority to the present application.

Primary Examiner — David M Fenstermacher
(74) Attorney, Agent, or Firm — Egbert Law Offices, PLLC (57) ABSTRACT A power transmission for a turbine or a compressor has a housing, a first shaft rotatably mounted so as to be rotatable in one direction in the housing, a barrel rotatably mounted so as to be rotatable in a direction opposite to that of the first shaft within the housing, a first plurality of blades affixed to the first shaft and extending radially outwardly therefrom, and a second plurality of blades affixed to the barrel and extending inwardly therefrom. Each blade of the second plurality of blades is interposed between adjacent blades of the first plurality of blades. A second shaft is mounted exterior of the housing so as to drive the barrel in rotation.

18 Claims, 9 Drawing Sheets (56) References Cited

U.S. PATENT DOCUMENTS

| | | | |
|---|---|---|---|
| 4,969,325 A | 12/1990 | Adamson et al. | |
| 6,278,197 B1 | 8/2001 | Appa | |
| 6,381,948 B1 * | 5/2002 | Klingels | F01D 25/16 |
| | | | 416/129 |
| 7,195,446 B2 | 3/2007 | Seda et al. | |
| 7,290,386 B2 | 11/2007 | Orlando et al. | |
| 7,451,592 B2 | 11/2008 | Taylor et al. | |
| 8,099,944 B2 * | 1/2012 | Foster | F02C 6/18 |
| | | | 60/226.1 |
| 8,393,853 B2 | 3/2013 | Sauer et al. | |
| 9,410,430 B2 * | 8/2016 | Haskin | F01D 1/24 |
| 9,534,608 B2 * | 1/2017 | Gehlot | F04D 19/024 |
| 9,745,860 B1 * | 8/2017 | Haskin | F01D 15/12 |
| 10,077,660 B2 * | 9/2018 | Hofer | F01D 1/04 |
| 2005/0202776 A1 | 9/2005 | Avedon | |
| 2006/0090451 A1 | 5/2006 | Moniz et al. | |
| 2009/0320491 A1 | 12/2009 | Copeland | |
| 2011/0000222 A1 | 1/2011 | Black et al. | |
| 2012/0049523 A1 | 3/2012 | Bersiek | |
| 2013/0219859 A1 | 8/2013 | Suciu et al. | |
| 2013/0223993 A1 | 8/2013 | Merry et al. | |
| 2013/0230380 A1 | 9/2013 | Allouche et al. | |

* cited by examiner

POWER TRANSMISSION SYSTEM FOR TURBINES OR COMPRESSORS HAVING COUNTER-ROTATING BLADES

CROSS-REFERENCE TO RELATED APPLICATIONS

The present application is a continuation-in-part of U.S. patent application Ser. No. 15/341,628, filed on Nov. 2, 2016 and entitled "Power Transmission System for Turbine or Compressor Having Counter-Rotating Blades", presently pending.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to power transmission apparatus. More particularly, the present invention relates to power transmission systems as used with turbines or compressors having counter-rotating blades.

2. Description of Related Art Including Information Disclosed Under 37 CFR 1.97 and 37 CFR 1.98

A steam turbine is a device that extracts thermal energy from pressurized steam and uses it to do mechanical work on a rotating output shaft. Because the turbine generates rotary motion, it is particularly suited to be used to drive an electrical generator. Approximately 90% of all electrical generation in the United States is by the use of steam turbines. The steam turbine is a form of heat engine that derives much of its improvement in thermodynamic efficiency from the use of multiple stages in the expansion of the steam. Steam turbines are made in a variety of sizes ranging from small (i.e. less than 0.75 kW) to approximately 1,500,000 kW. The small units are used as mechanical drives for pumps, compressors and other shaft-driven equipment. Large turbines are used to generate electricity.

Turbine blades are of two basic types, blades and nozzles. Blades move entirely due to the impact of steam on them. Their profiles do not converge. This results in a steam velocity drop and essentially no pressure drop as steam moves through the blades. A turbine composed of blades alternating with fixed nozzles is called an impulse turbine, a Curtis turbine, a Rateau turbine, or a Brown-Curtis turbine. Nozzles appear similar to blades, but their profiles converge near the exit. This results in a steam pressure drop and velocity increase as steam moves through the nozzles. Nozzles move due to both the impact of steam on them and the reaction due to the high-velocity steam at the exit. A turbine composed of moving nozzles alternating with fixed nozzles is called a reaction turbine or a Parsons turbine.

Except for low-power applications, turbine blades are arranged in multiple stages in series, called compounding, which greatly improves efficiency at low speeds. A reaction stage is a row of fixed nozzles followed by a row of moving nozzles. Multiple reaction stages divide the pressure drop between the steam inlet and exhaust. Numerous small drops result in a pressure-compounded turbine. Impulse stages may be either pressure-compounded, velocity-compounded, or pressure-velocity compounded. A pressure-compounded impulse stage is a row of fixed nozzles followed by row of moving blades, with multiple stages for compounding. A velocity-compounded impulse stage is a row of fixed nozzles followed by two or more rows of moving blades alternating with rows of fixed blades. This divides the velocity drop across the stage into several smaller drops.

Condensing turbines are most commonly found in electrical power plants. These turbines exhaust steam from a boiler in a partially condensed state at a pressure well below atmospheric to a condenser. Non-condensing or back pressure turbines were most widely used for process steam applications. The exhaust pressure is controlled by a regulating valve to suit the needs of the process steam pressure. These are commonly found at refineries, district heating units, pulp and paper plants, and desalination facilities where large amounts of low-pressure process steam are needed. Reheat turbines are also almost used exclusively in electrical power plants. In a reheat turbine, steam flow exits from a high-pressure section of the turbine and is returned to the boiler where additional superheat is added. The steam goes back into an intermediate pressure section of the turbine and continues its expansion. Using reheat in a cycle increases the work output from the turbine and also the expansion reaches conclusion before the steam condenses. As such, this minimizes the erosion of the blades in the last rows. Extracting-type turbines are common in various applications. In an extracting-type turbine, steam is released from the various stages of the turbine and used for industrial process needs or sent to boiler feedwater heaters to improve overall cycle effect efficiency. Induction turbines introduce low-pressure steam at an intermediate stage to produce additional power.

A gas compressor is a mechanical device that increases the pressure of the gas by reducing its volume. Compressors are similar to pumps. Both increase the pressure on a fluid and both can transport the fluid through a pipe. Since gases are compressible, the compressor also reduces the volume of the gas. Axial-flow compressors are dynamic rotating compressors that use arrays of fan-like airfoils to progressively compress the working fluid. The arrays of airfoils are set in rows, usually as pairs, one rotating and one stationary. The rotating airfoils, also known as blades or rotors, accelerate the fluid. The stationary airfoils, also known as stators or vanes, decelerate and redirect the flow direction of the fluid preparing it for the rotor blades at the next stage. Axial compressors are almost always multi-stage, but the cross-sectional area of the gas passage diminishes along the compressor to maintain an optimal axial Mach number.

In such turbines, a fluid stream, under pressure, impinges on a set of blades (or buckets) connected to a central shaft to produce work. This results in changes in the angular velocity of the fluid stream. These changes in an angular velocity serve to strike the next set of blades connected to the shaft in the most efficient manner. There is an intermediate set of blades which are set at a different angle to realign the flow so as to impinge upon the next set of working blades at the most efficient angle. The set of intermediate blades in most equipment is currently fixed to the stationary element. This process uses approximately 40% of the working fluid energy without producing any work.

In the past, various patents and patent publications have issued relating to such turbines. For example, U.S. Pat. No. 4,648,788, issued on Mar. 10, 1987 to P. Jochum, describes a device and a fluid pressure generator that includes an annular casing which is peripherally mounted and driven in a through-flow channel. The interface of the annular casing forms part of the wall of the through-flow channel. The annular casing is provided with a number of propeller blades which extend radially inwardly into the through-flow channel and which are rotationally mounted on their individual pin shafts by means of which the magnitude of the thrust may be altered in a continuous manner and the direction of the operation of the thrust can be reset.

U.S. Pat. No. 4,969,325, issued on Nov. 13, 1992 Adamson et al., shows a turbofan engine having a counter-rotating partially-geared fan drive turbine. This turbofan engine has a fan section, a booster compressor disposed aft of the fan section relative to the flow of combustion gases through the engine, and a core section disposed aft the booster compressor. A low-pressure counterrotating turbine, disposed aft the core section, is used for driving the fans section and the booster compressor. The counterrotating turbine includes at least one set of rotating turbine blades and at least one set of oppositely rotating counterrotating turbine blades. A twin spool shaft is provided for coupling the turbine blades to the booster compressor and for coupling the counterrotating turbine blades to the fans section.

U.S. Pat. No. 6,278,197, issued on Aug. 21, 2001 the K. Appa, discloses a contra-rotating wind turbine system. A hub assembly is provided having inner and outer coaxial shafts telescopically related but radially spaced to permit independent rotation about a generally horizontal axis. A first set of rotor blades is mounted on the inner shaft at a plurality of circumferentially-spaced locations. The rotor blades extend radially away from the axis of rotation and positioned on the inner shaft for rotating the inner shaft in a first direction about the axis of rotation when subjected to wind-induced airflow. A second set of rotor blades is similarly mounted on the outer shaft axially spaced from the first set of rotor blades for rotating the outer shaft about the axis of rotation in an opposite direction.

U.S. Pat. No. 7,195,446, issued a Mar. 27, 2007 to Seda et al., provides a counter-rotating turbine engine that provides a low-pressure turbine inner rotor configured to rotate in a first direction and a low-pressure turbine outer rotor configured to rotate in a second direction that is opposite to the first rotational direction. At least one foil bearing is coupled to at least one of the inner and outer rotors so as to improve clearance control between a first rotating component and at least one of a second rotating component and a non-rotating component.

U.S. Pat. No. 7,290,386, issued on Nov. 6, 2007 to Orlando et al., teaches a counter-rotating gas turbine engine. A low-pressure turbine inner rotor includes a first plurality of turbine blade rows configured to rotate in a first direction and a low-pressure turbine outer rotor rotatably coupled to the inner rotor. The outer rotor includes a second plurality of turbine blade rows that are configured to rotate in a second direction that is opposite the first rotational direction of the inner rotor such that at least one of the second plurality of turbine blade rows is coupled axially forward of the first plurality of turbine blade rows.

U.S. Pat. No. 7,451,592, issued on Nov. 18, 2008 to Taylor et al., teaches a counter-rotating turbine engine which includes a gearbox. The turbine engine arrangement is provided with contra-rotating shafts and a gearbox which is also coupled to a shaft. The relative rotational speed ratio between the shafts can be determined with a first low-pressure turbine secured to the first shaft arranged to rotate at a lower speed but provide high work whilst a second low-pressure turbine secured to the second shaft rotates at a higher speed governed by the gearbox.

U.S. Pat. No. 8,393,853, issued on Mar. 12, 2013 to Sauer et al., provides a high-efficiency turbine and method of generating power. The turbine includes a plurality of blades that rotate in a single direction when exposed to a fluid flow. The plurality of blades are joined to the central shaft by a plurality of radial spokes disposed substantially perpendicular to the central shaft such that the rotating plurality of blades causes the shaft to rotate.

U.S. Patent Publication No. 2012/0049523, published on Mar. 1, 2012 to S. A. Bersiek, describes a wind jet turbine with fan blades located on an inner and outer surface of the cylinder so as to allow wind or liquid to pass through the inner and outer blades. The wind jet turbine has a first set of fan blades, a plurality of magnets that each has a magnetic field, a cylinder having an inside and outside surface that supports the first set of fan blades on the inside surface and coupled to the plurality of magnets, and at least one cable winding located apart from the magnets. The rotation of the cylinder results in the movement of the magnetic field across at least one cable winding.

U.S. Patent Publication No. 2013/0219859, published in Aug. 29, 2013 to Suciu et al., provides a counter-rotating low-pressure compressor and turbine. The compressor section includes a counter-rotating low-pressure compressor that includes outer and inner compressor blades interspersed with one another and configured to rotate in opposite directions to one another about an axis of rotation. A transmission couples at least one of the outer and inner compressor blades to a shaft. The turbine section includes a counter-rotating low-pressure turbine having an outer rotor that includes an outer set of turbine blades. An inner rotor has an inner set of turbine blades interspersed with the outer set of turbine blades. The outer rotor is configured to rotate in an opposite direction about the axis of rotation from the inner rotor. A gear system couples at least one of the outer and inner rotors to the shaft.

U.S. Patent Publication No. 2013/0230380, published on Sep. 5, 2013 to Allouche et al., discloses a rotating housing turbine. The housing has a side wall. The turbine blades are attached to the side wall. The turbine is completely open in the center so as to allow a space for solids and debris to be directed out of the turbine without jamming the spinning blades/side wall.

U.S. Pat. No. 3,524,318, issued on Aug. 18, 1970 shows a gas turbine power plant having an axial-flow compressor. This axial flow compressor includes counter-rotating rotors.

U.S. Pat. No. 3,673,802, issued on Jul. 4, 1972 to Krebs et al., describes a fan engine with a counter-rotating geared core booster. The compressor has a pair of counter-rotating elements, a rotating duct which carries fan blades on the exterior surface, and compressor blades on the interior surface. A conventional compressor rotor rotates in a direction counter to the direction of the rotation of the rotating duct. Alternative gearing schemes are shown for coupling the rotation of the fan to the rotation of the low-pressure compressor.

U.S. Pat. No. 4,159,624, nation of Jul. 3, 1979 to G. P. Gruner, describes a gas turbine power plant that has a compressor stage and a turbine stage with an annular combustion stage therebetween. Each of the counter-rotating compressor rotors is connected to one of the counter-rotatable turbine rotors by an elongated hollow cylindrical shaft concentric with an axially extending fixed shaft to form an integral unit. The units are operably connected by differential gearing mounted on the fixed shaft.

U.S. Pat. No. 4,790,133, issued on Dec. 13, 1988 to A. R. Stuart, shows a counter-rotating turbo fan engine. This engine has a core gas generator for generating combustion gases, a power turbine, a fan section, and a booster. The power turbine includes first and second counter rotating turbine blade rows effective for rotating first and second driveshafts, respectively. The fan section includes a first fan blade row connected to the first driveshaft and a second fan blade row connected to the second driveshaft.

U.S. Pat. No. 4,860,537, issued on Aug. 29, 1989 to J. B. Taylor, describes a counter rotating gearless front fan engine for generating combustion gases. The power turbine includes a pair of counter-rotating turbine blade rows which are alternately interdigitized and serve to rotate counter-rotating first and second driveshafts, respectively. The fan section includes counter-rotating spaced apart fan blade sections which are respectively connected to the first and second driveshafts.

U.S. Patent Application Publication No. 2006/0090451, published on May 4, 2006 to Moniz et al., provides a counter-rotating gas turbine engine in which a first fan assembly includes a plurality of rotor blades that are configured to rotate in a first rotational direction at a first rotational speed and a second fan assembly including a plurality of rotor blades that are configured to rotate in a second rotational direction. A gearbox is coupled to the second fan assembly which is configured to rotate the second fan assembly at a second rotational speed that is different than the first rotational speed.

U.S. Patent Application Publication No. 2011/0000222, published on Jan. 6, 2011 to Black et al., provides a rotor stator support system for a gas turbine. The system includes at least one support leg in operable communication with a bearing of the rotor and with the support base. There is at least one strut in communication with the support leg and with the stator.

U.S. Patent Application Publication No. 2013/0223993, published on Aug. 29, 2013 to Merry et al., teaches a gas turbine engine that includes a shaft that defines an axis of rotation. An outer rotor directly drives the shaft and includes an outer set of blades. An inner rotor has an inner set of blades interspersed with the outer set of blades. The inner rotor is configured to rotate in an opposite direction about the axis of rotation from the outer rotor. A gear system couples the inner rotor to the shaft and is configured to rotate the inner set of blades at a faster speed than the outer set of blades.

Figure 1:
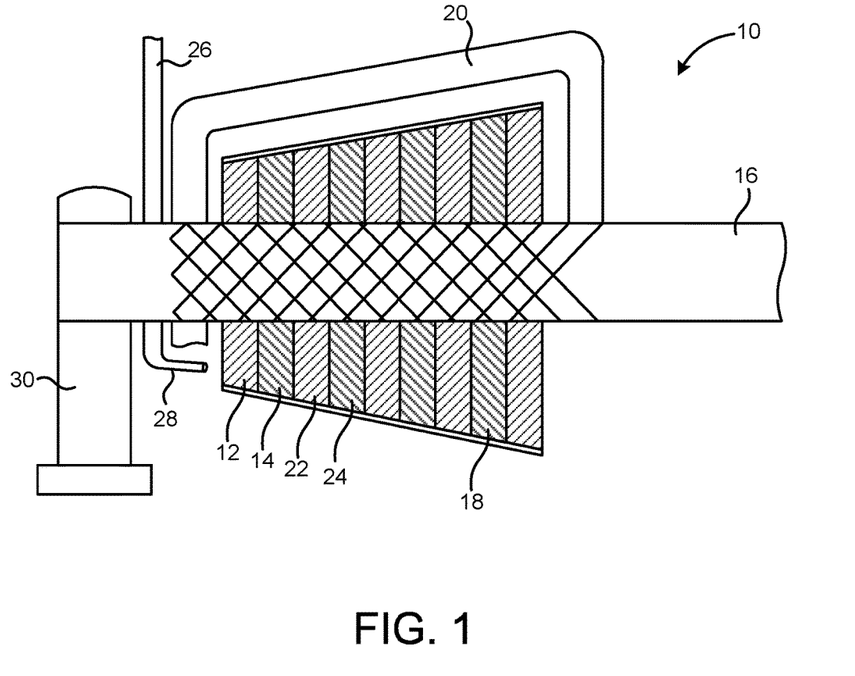
FIG. 1 is a cross-sectional view showing the compressor or turbine with counter-rotating blades in accordance with U.S. Pat. No. 9,410,430 to the present inventor.

U.S. Pat. No. 9,410,430, issued on Aug. 9, 2016 to the present inventor, teaches a turbine apparatus with counter-rotating blades. In particular, FIG. 1 herein shows this turbine apparatus. Referring to FIG. 1 herein, there shown the turbine apparatus 10 in accordance with the present invention. The turbine apparatus 10 includes a first set of blades 12, a second set of blades 14, a main shaft 16, a barrel 18, and an outer shell 20. In FIG. 1, it can be seen that the first set of blades 12 is directly mounted to the main shaft 16. The second set of blades 14 is directly mounted, at a periphery thereof, to the barrel 18 or the housing. The main shaft 16 extends centrally through the first set of blades 12 and the second set of blades 14. The main shaft 16 is not connected to the second set of blades 14. In the preferred embodiment the present invention, the second set of blades 14 will rotate in a direction opposite to the second set of blades 12 and to the direction of rotation of the main shaft 16. As a result, the barrel 18 will rotate in a direction opposite to the rotation of the main shaft 16.

In FIG. 1, it can be seen that there is a third set of blades 22 that is affixed to the main shaft 16. The third set of blades 22 extends in generally parallel relationship to the first set of blades 12. The second set of blades 14 is positioned between the first set of blades 12 and the second set of blades 14. There is a fourth set of blades 24 that is mounted, at the periphery thereof, to the barrel 18. As such, when the first of blades 12 and the third set of blades 22 rotate with the rotation of the main shaft 16, the second set of blades 14 and the fourth set of blades 24 will rotate in the opposite direction.

A fluid inlet 26 is directed toward the first set of blades 12 within the interior of the barrel 18. The fluid inlet 26 includes a nozzle 28 for directing the fluid into the interior of the barrel 18 and toward the first set of blades 12. The injection of the fluid through the fluid inlet 26 will impart rotational movement to the first set of blades 12. The direction of the blades within the first set of blades 12 will impart an opposite directional movement to the second set of blades 14 such that the barrel 18 will rotate in the opposite direction. The orientation of the blades of the second set of blades 14 will be directed to the third set of blades 22 so as to further direct rotational energy toward the third set of blades 22. Similarly, the orientation of the blades in the third set of blades 22 is directed to the fourth set of blades 24 so as to further enhance the torque applied by the fourth set of blades 24 to the barrel 18.

The shaft 16 is mounted within bearings and supported by a bearing pedestal 30. The bearing pedestal 30 can be supported upon an underlying surface, such as a floor or deck. The bearing supports the main shaft 16 in a rotatable configuration. The rotatable shaft 16 can extend for use exterior of the turbine apparatus 10. For example, the main shaft 16 can extend so as to be linked to a power source, such as an electrical generator, a boiler feed pump, a compressor, a water pump, a hydraulic unit, or other systems that can utilize rotational energy.

The outer shell 20 extends around the exterior of the barrel 18. As such, the interior of the outer shell 20 is sufficiently sealed so as to avoid loss of pressurized fluid and friction with exterior elements.

As will be described hereinafter, the rotating barrel 18 can be suitably coupled to allow for the rotation of another shaft or to facilitate the rotation of the main shaft 16. For example, the rotating barrel 18 can be coupled by a gear arrangement to another shaft located adjacent to the main shaft 16. Alternatively, a planetary gear arrangement can be coupled between the barrel 18 in the main shaft 16 such that rotational energy of the barrel 18 can be delivered to the main shaft. Still further and alternatively, various rollers, or other connecting devices, can be coupled to the barrel 18 such that the rotating energy of the barrel 18 can be delivered for external use.

Upon experimentation with the configuration of U.S. Pat. No. 9,410,430, it was found that it was important to provide a proper transmission system whereby the rotational energy of the counter-rotating blades can be transmitted to an external power receiver. Additionally, it was found that since the turbines or compressors generate a significant amount of force upon the blades, a configuration of thrust bearings is necessary so as to resist the deflection caused by this force. Additionally, it was found necessary to configure a system whereby the transmission system maximizes the amount of energy that can be transmitted from the counter-rotating blades of the compressor or turbine to a generator and/or a pump.

One problem associated with U.S. Pat. No. 9,410,430 was that the bearings for the power transmission system reside on the interior and fluid flow pathway of the system. As such, these bearings are exposed to extremely high temperatures. Extremely high temperatures can have negative effects on the quality and life of bearings. As such, a need developed so as to position the bearings for the barrel in an area beyond the heated gases flowing through the system. Additionally, it was important to position a power transmitter exterior of they housing so as to easily effect installation, repair and maintenance.

It is an object of the present invention to provide a turbine or compressor system that utilizes a greater percentage of the energy of the working fluid.

It is another object the present invention to provide a turbine or compressor apparatus that is suitable for powering boiler feed pumps, auxiliary pumps, hydraulics, electrical generators, and other items connected to a main shaft.

It is another object of the present invention to provide a transmission system that is able to couple the energy from the counter-rotating blades to an external power receiver, such as a generator or a pump.

It is still another object of the present invention to provide a power transmission system that effectively maximizes the power that can be delivered by the counter-rotating blades.

It is still a further object of the present invention to provide a power transmission system where in the bearings for the rotatable barrel are positioned out of the heated air flow passage.

It is still another object of the present invention to provide a power transmission system in which the shaft which receives our transmits rotation to the barrel is mounted exterior of the housing.

These and other objects and advantages of the present invention will become apparent from a reading of the attached specification and appended claims.

BRIEF SUMMARY OF THE INVENTION

The present invention is a power transmission apparatus that comprises a housing, a first shaft rotatably mounted so as to be rotatable in one direction within the housing, a barrel rotatably mounted so as to be rotatable in a direction opposite to that of the first shaft within the housing, a first plurality of blades affixed to the first shaft and extending radially outwardly therefrom, and a second plurality of blades affixed to the barrel and extending inwardly therefrom. The first plurality of blades are in spaced relation to each other. Each blade of the second plurality of blades is interposed between adjacent blades of the first plurality of blades.

A first bearing set is positioned on an exterior of the housing. The barrel has an end that is mounted on the first bearing set. In particular, the barrel has an end portion extending over an end of the housing such that the end of the barrel fits onto the first bearing set.

A second shaft is rotatably mounted exterior of the housing. The second shaft engages the end portion of the barrel such that a rotation of the second shaft causes a corresponding rotation of the barrel. The second shaft is linked to the end portion of the barrel by a transmission. This transmission can be either gears, belts, chains and cog belts.

The housing has a fluid inlet or a fluid outlet passage. A second bearing set is mounted on an inner wall of the housing in a location beyond the passage. The barrel has an opposite end mounted to the second bearing set. The housing has a first end and a second end. The first and second pluralities of blades decrease in diameter from the first end toward the second end. The barrel has a first portion narrowing in inner diameter and a second portion expanding in inner diameter. The second plurality of blades is mounted onto the first portion of the barrel. A power receiver is positioned outwardly of the housing. The power receiver can be either a generator, a pump, a turbine, or a compressor.

The foregoing Section is intended to describe, with particularity, the preferred embodiment of the present invention. It is understood that modifications to this preferred embodiment can be made within the scope of the present invention. As such, this Section should not to be construed, in any way, as limiting of the scope of the present invention. The present invention should only be limited by the following claims and their legal equivalents.

DETAILED DESCRIPTION OF THE INVENTION

Figure 2:
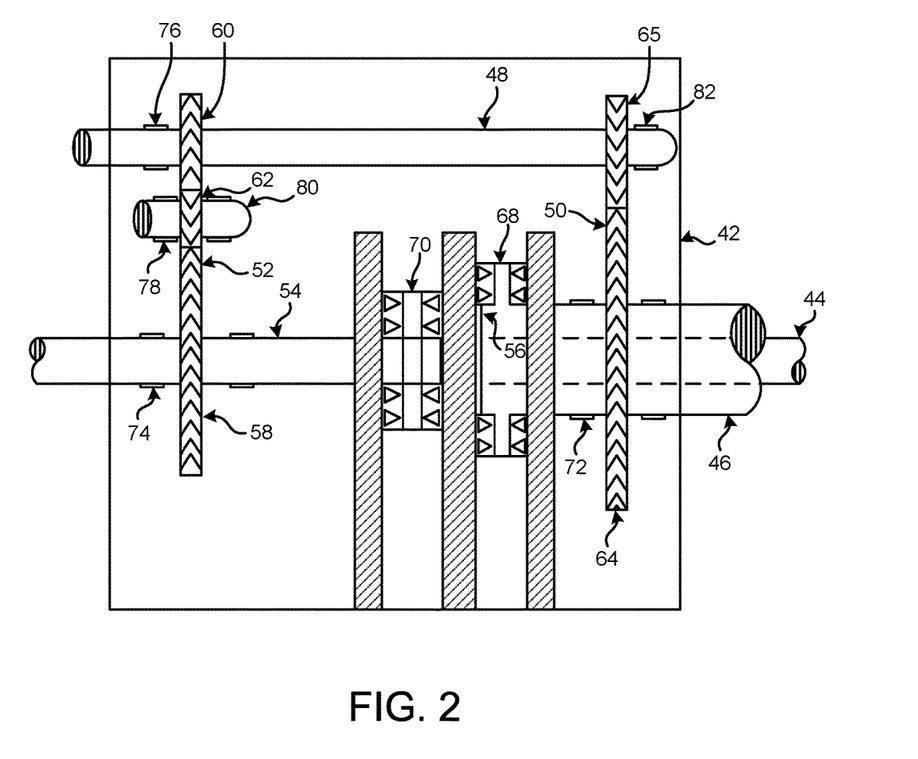
FIG. 2 is a cross-sectional view showing an embodiment of the power transmission system of the present invention.

FIG. 2 shows the power transmission system 40 in accordance with the teachings of one embodiment of the present invention. The power transmission system 40 includes a housing 42, a first shaft 44 rotatably mounted within the housing 42, a second shaft 46 rotatably mounted within the housing 42, a third shaft 48 positioned exterior of the first shaft 44 and the second shaft 46 and rotatably mounted within the housing 42, a first transmission 50 connected to the second shaft 46 and to the third shaft 48 such that a rotation of the second shaft 46 causes a rotation of the third shaft 48, and a second transmission 52 connected to the first shaft 44 and to the third shaft 48 such that a rotation of the first shaft 44 applies rotational energy to the third shaft 48. The ends of the first shaft 44 and the second shaft 46 can be connected to the counter-rotating blades of the compressor or turbine of FIG. 1. A power receiver can be connected to the end of the third shaft 48 so as to convert the rotation of the energy of the third shaft 48 into energy or motion. In particular, the power receiver can be in the nature of a generator and/or a pump.

In FIG. 2, it can be seen that the first shaft 44 extends entirely through the second shaft 46 so as to have another portion 54 extending outwardly of an end 56 of the second shaft 46. The second transmission 52 is connected to this portion 54 of the first shaft 44. The first shaft 44 will rotate in a direction opposite to the direction of the second shaft. As such, a particular type of transmission is required so as to transmit the rotational energy of the first shaft into the third shaft 44 such that power is supplied so as to rotate the third shaft 48 by both the first transmission 50 and the second transmission 52 which, respectively, extend from the second shaft 46 and the first shaft 44.

In FIG. 2, the second transmission 52 includes a first gear 58 which is affixed to the portion 54 of the first shaft 44, a second gear 60 that is affixed to the third shaft 48, and an idler gear 62 which is positioned between the first gear 58 and the second gear 60 so as to convert the direction of rotation of the first shaft 44 into an opposite direction of rotation of the third shaft 48.

The first transmission 50 has a first gear 64 that is affixed to the second shaft 46 and a second gear 65 that is affixed to the third shaft 48. The teeth of the gears 64 and 65 mesh so as to transfer rotational energy from the second shaft 46 to the third shaft 48.

Since there is a significant amount of force applied to the blades in the compressor or turbine of FIG. 1, it is important to be able to resist such forces within the interior of the housing 42. As such, there is a first thrust bearing 68 which bears against the end 56 of the second shaft 46. There is another set of thrust bearings 70 that bear against a surface of the first shaft 44.

So as to facilitate the rotation of the first shaft 44 and the second shaft 46, there are shaft bearings applied within the interior of the housing 42. A first shaft bearing 72 will extend around the outer diameter of the shaft 46 in a location between the first transmission 50 and the thrust bearings 68. Another shaft bearing 74 is positioned around the exterior diameter of the first shaft 44 in a location outwardly of the second transmission 52. Another shaft bearing 76 is positioned around the exterior diameter of the third shaft 48 to the side of the second transmission 52. Another shaft bearings 78 is applied around the idler shaft 80. Another shaft bearing 82 is applied around the exterior diameter of the third shaft 48 in a location on the side of the first transmission 50 opposite to the second transmission 60. The shaft bearings facilitate the rotation of each of the shafts and maintain the shafts in a proper position within the interior of the housing 42.

Figure 3:
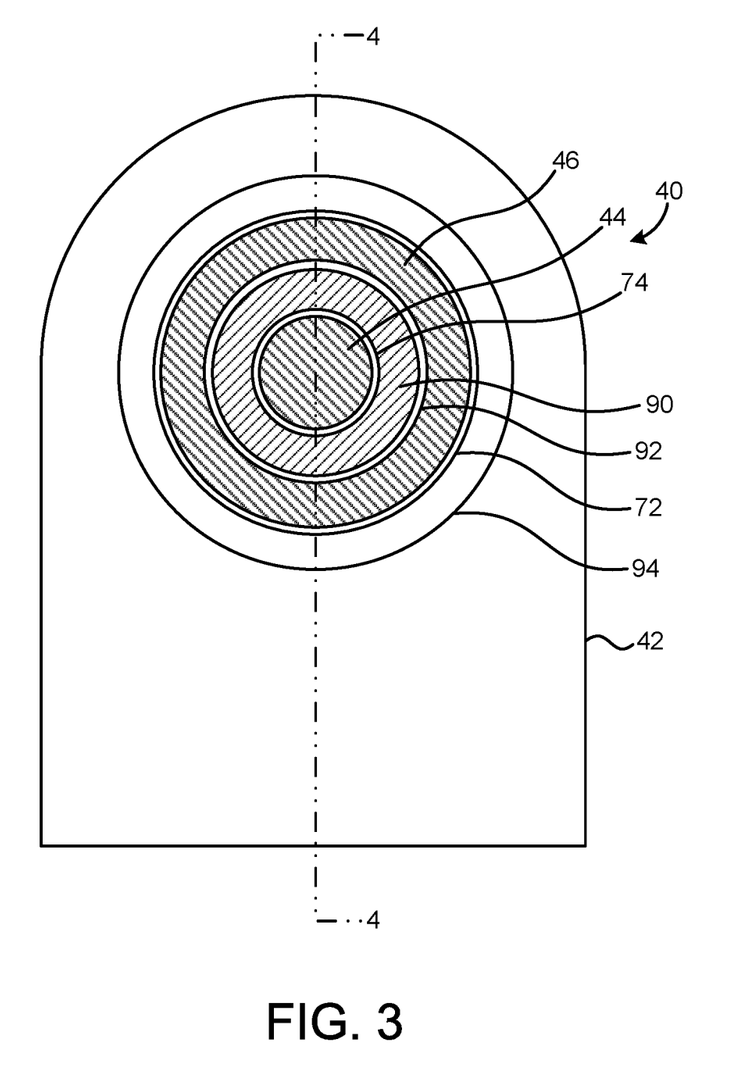
FIG. 3 is a cross-sectional view showing the relationship between the first shaft and the second shaft within the housing of this embodiment of the present invention.

FIG. 3 shows the configuration of the first shaft 44 and the second shaft 46 within the interior of the housing 40. In particular, it can be seen that the shaft bearing 74 extends around the outer diameter of the first shaft 44. The internal bearing support 90 will extend around the outer diameter of the shaft bearing 74. An inner bushing 92 is shown is positioned around the outer diameter of the bearing support 90. The second shaft 46 is shown on an exterior of the bushing 92. The shaft bearing 72 for the second shaft 46 extends around the outer diameter of the second shaft 46. The shaft bearing 72 provides support between the second shaft 46 and the opening 94 of the housing 42.

Figure 4:
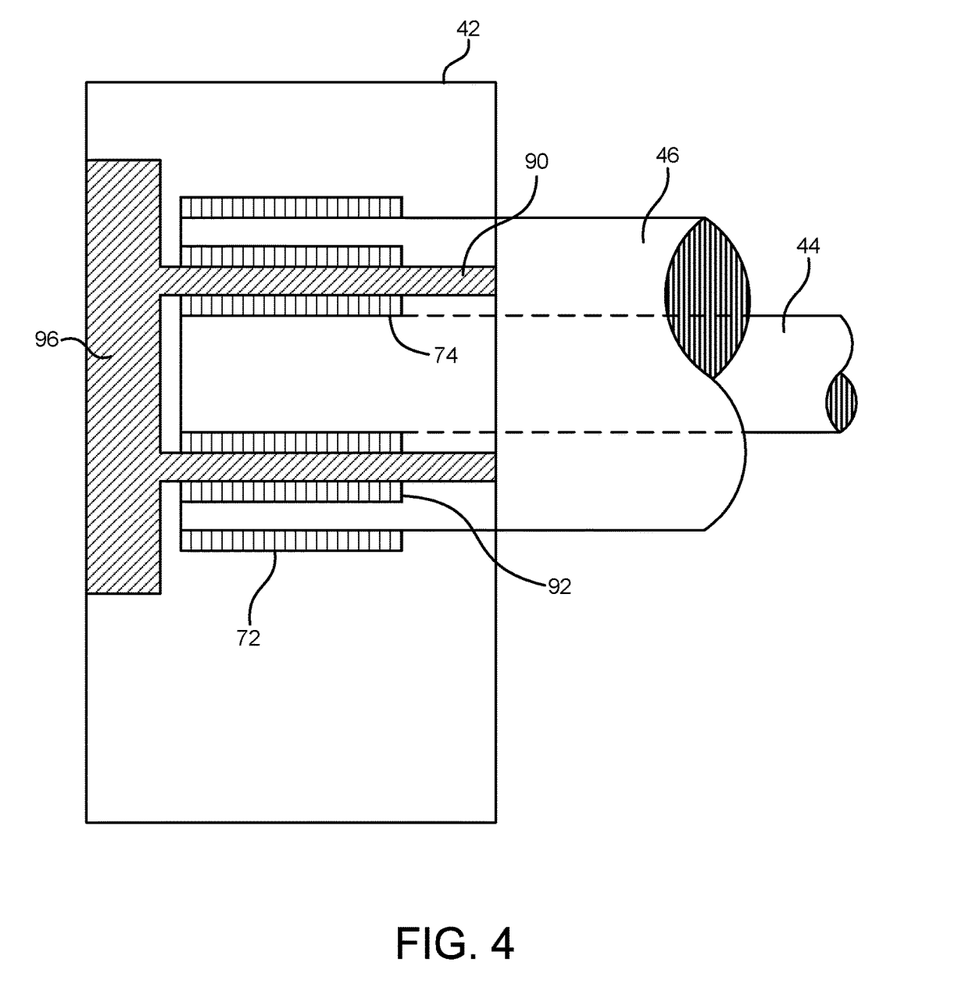
FIG. 4 is a cross-sectional view taken across lines 4-4 of FIG. 3.

FIG. 4 shows that there is a radial support 96 positioned in the housing 42. The bearing support 90 extends outwardly of the radial support 96. The first shaft bearing 74 is interposed between the bearing support 90 and the outer diameter of the first shaft 44. The shaft bearing 72 extends around the outer diameter of the second shaft 46. The radial support 96, along with the arrangement of bearings and bearing supports resists any forces that are applied to the counter-rotating blades in the turbine or compressor blades that are connected to the shafts 44 and 46. The bearing support 90 and the radial support 96 can be integral and formed from a single machining.

Figure 5:
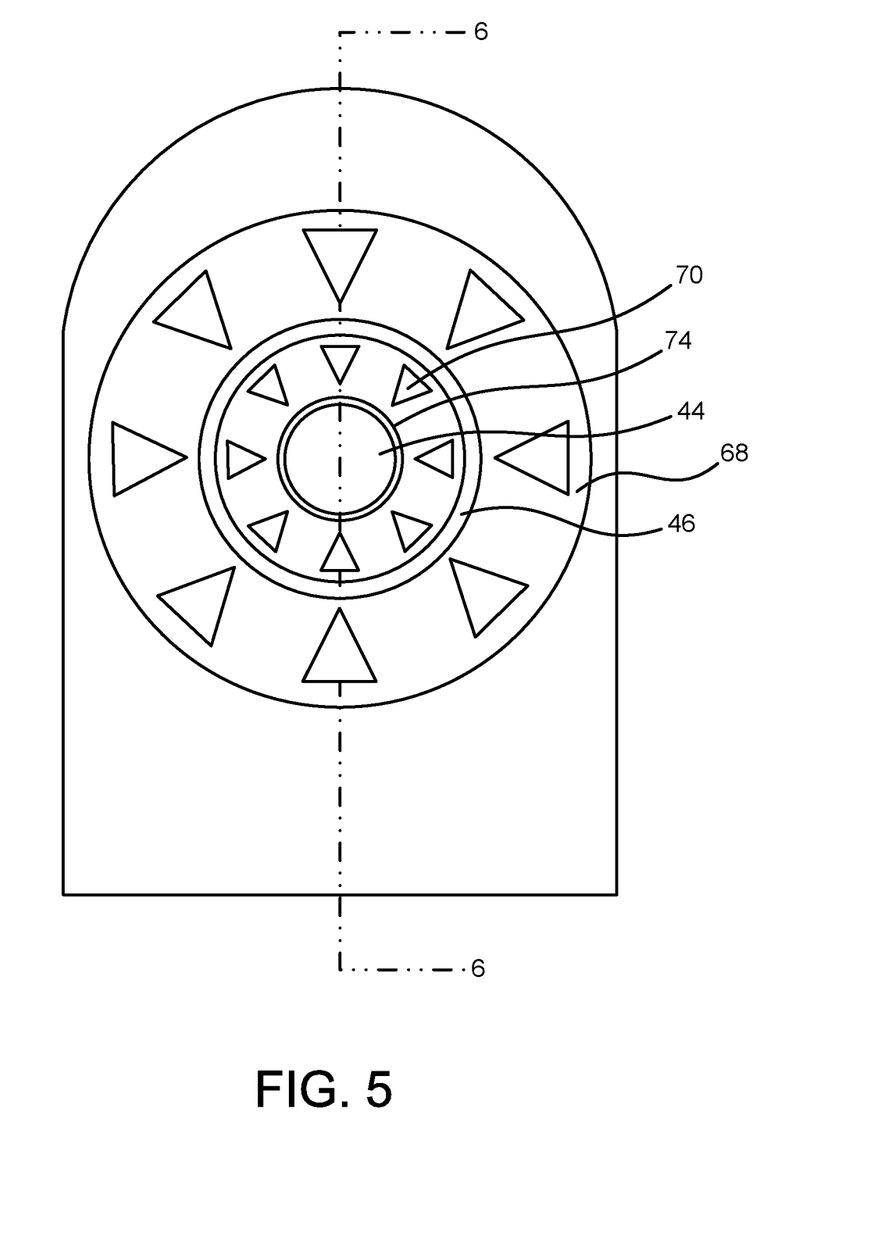
FIG. 5 is a cross-sectional end view showing the arrangement of thrust bearings as used with the first and second shafts of this embodiment of the present invention.

FIG. 5 shows the configuration of the various thrust bearings in relation to the shafts 44 and 46. The shaft bearing 74 extends around the first shaft 44. Thrust bearing 70 will bear against a surface of the first shaft 44 and extend therearound. The thrust bearing 70 can be located in interior of the second shaft 46. The thrust bearing 68 will extend so as to bear against the end of the second shaft 46 and is illustrated as extending therearound. As such, the first shaft 44 and the second shaft 46 are free to rotate in relation to the thrust bearings at the same time that the thrust bearings resist deflection forces upon the shafts 44 and 46.

Figure 6:
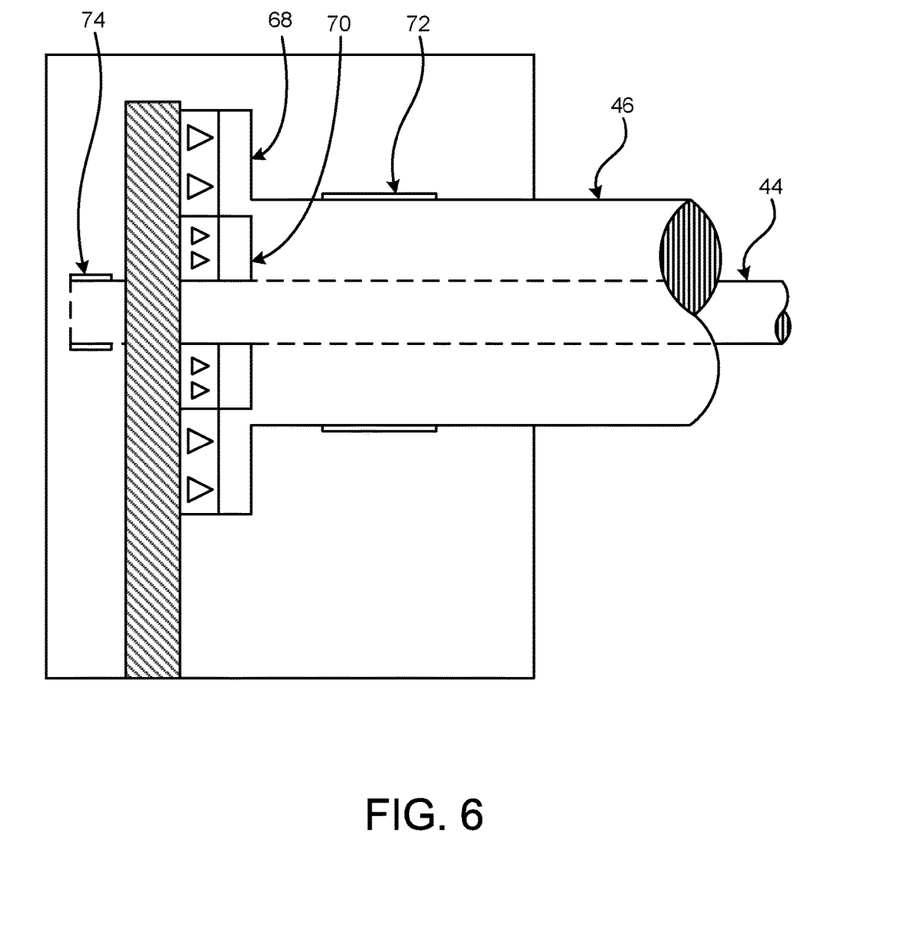
FIG. 6 is a cross-sectional view as taken across lines 6-6 of FIG. 5.

FIG. 6 shows the arrangement of the thrust bearings in relation to the shafts. In particular, thrust bearing 70 bears against a surface of the first shaft 44 within the interior of the second shaft 46. The thrust bearing 68 will bear against the end of the second shaft 46. Shaft bearing 74 extends around the outer diameter of the first shaft 44. Shaft bearing 72 extends around the outer diameter of the second shaft 46.

Figure 7:
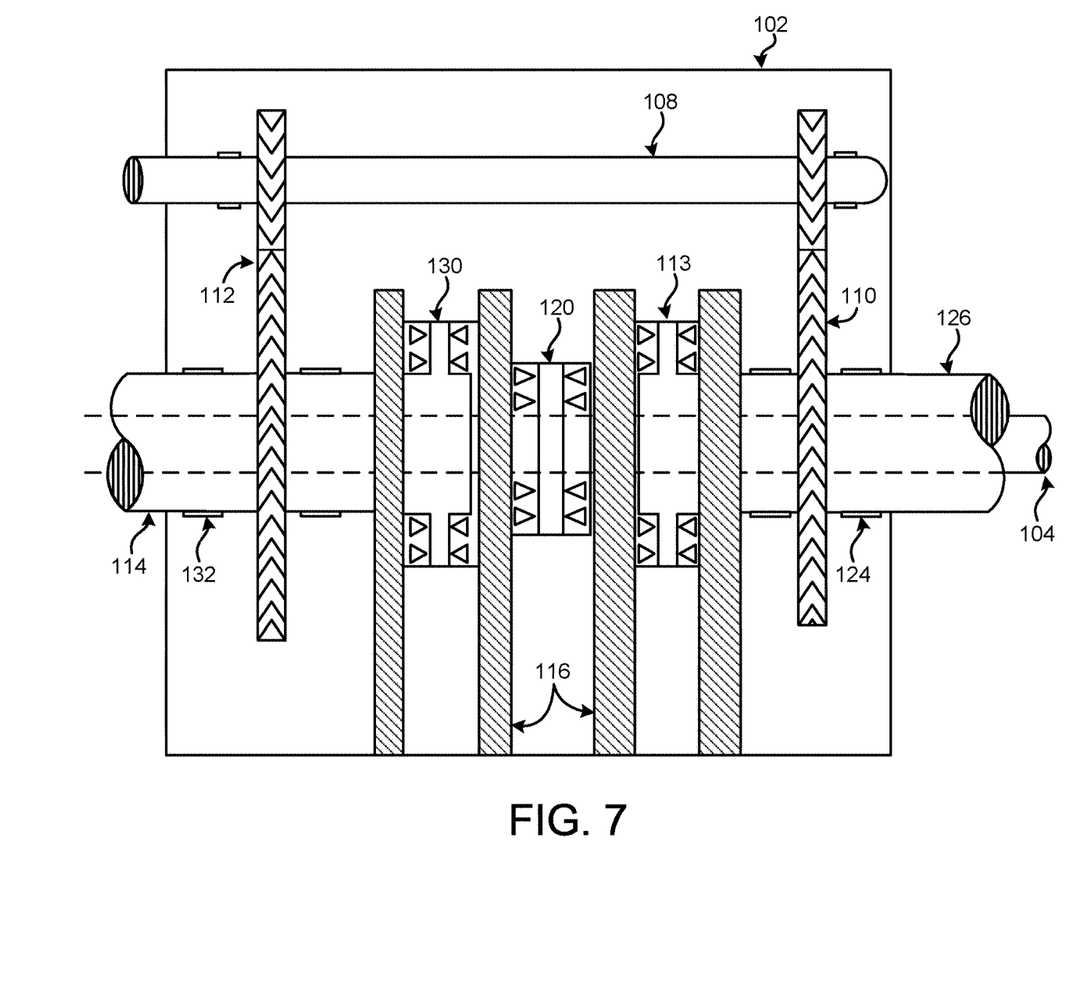
FIG. 7 is a cross-sectional view showing another embodiment of the power transmission system of the present invention.

FIG. 7 shows an alternative embodiment of the power transmission system 100 in accordance with the teachings the present invention. The power transmission system 100 includes a housing 102, a first shaft 104, a second shaft 126, and a third shaft 108. A first transmission 110 extends between the second shaft 126 and the third shaft 108. A second transmission 112 extends between a fourth shaft 114 and the third shaft 108. Importantly, the fourth shaft 114 that extends over the first shaft 104 in spaced relation to the second shaft 126 and axially aligned with the third shaft 108. The second transmission 112 is connected to the fourth shaft 114 and to the third shaft 108.

A thrust support 116 is positioned generally centrally within the housing 102. In particular, thrust bearings 113 are affixed to one side of the thrust support 116. Similarly, thrust bearings 120 are affixed to the thrust support 116. The thrust bearings 120 bear against a surface of the first shaft 104. The thrust bearings 113 bear against a surface of the second shaft 126. Ultimately, it can be seen that the end of the second shaft 126 is positioned at the side of the thrust support 116. A shaft bearing 124 extends around the second shaft 126 so as to facilitate the rotation and positioning of the second shaft 126. The energy of said shaft 126 is transmitted to fourth shaft 114 via third shaft 108 with no change in rotational direction.

The fourth shaft 114 also has an end that bears against the thrust support 116. Thrust bearings 130 extend around the outer diameter of the fourth shaft 114 and are affixed against the thrust support 116. A shaft bearing 132 surrounds the outer diameter of the fourth shaft 114 so as to facilitate the rotation and positioning of the fourth shaft 114. It can be seen that the first shaft 104 extends entirely through the second shaft 126, through the thrust support 116 and through the interior of the fourth shaft 114. Ultimately, as described hereinbefore, each of the shafts 104 and 126 can be connected to the counter rotating blades associated with a turbine or compressor of FIG. 1. The third shaft 108 can be connected to a power receiver, such as a generator or a pump. Importantly, if desired, the first shaft 104 can also be connected to a power receiver, such as a generator or a pump. Similarly, the fourth shaft 114 could also be connected to such an apparatus.

Figure 8:
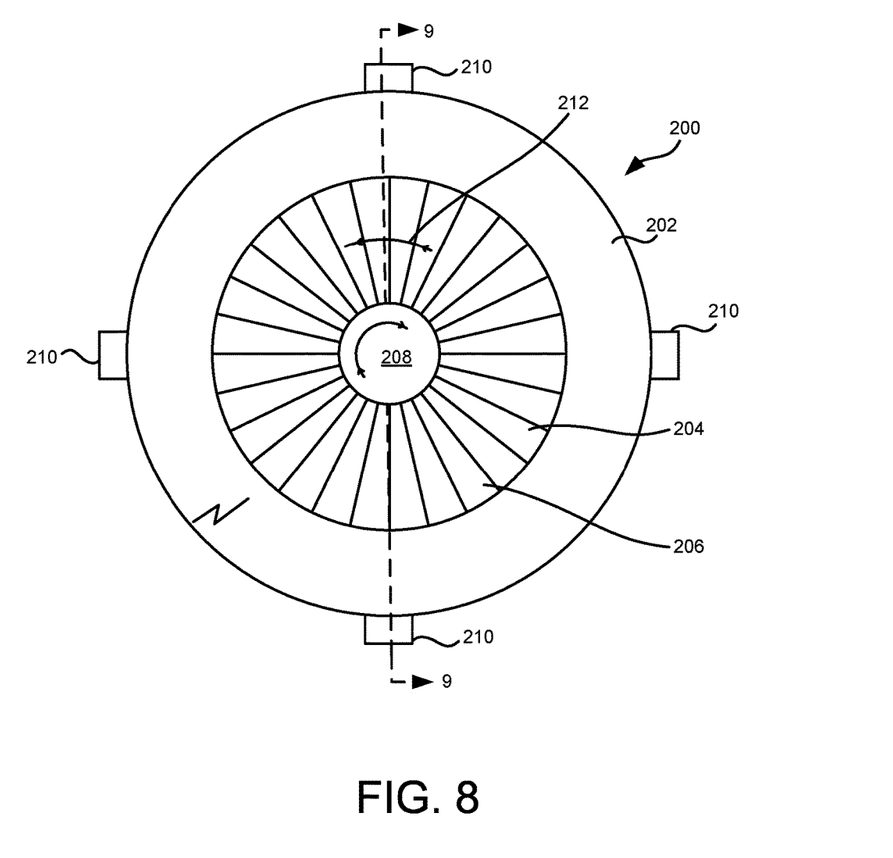
FIG. 8 is an end view of the preferred embodiment of the power transmission system of the present invention.
Figure 9:
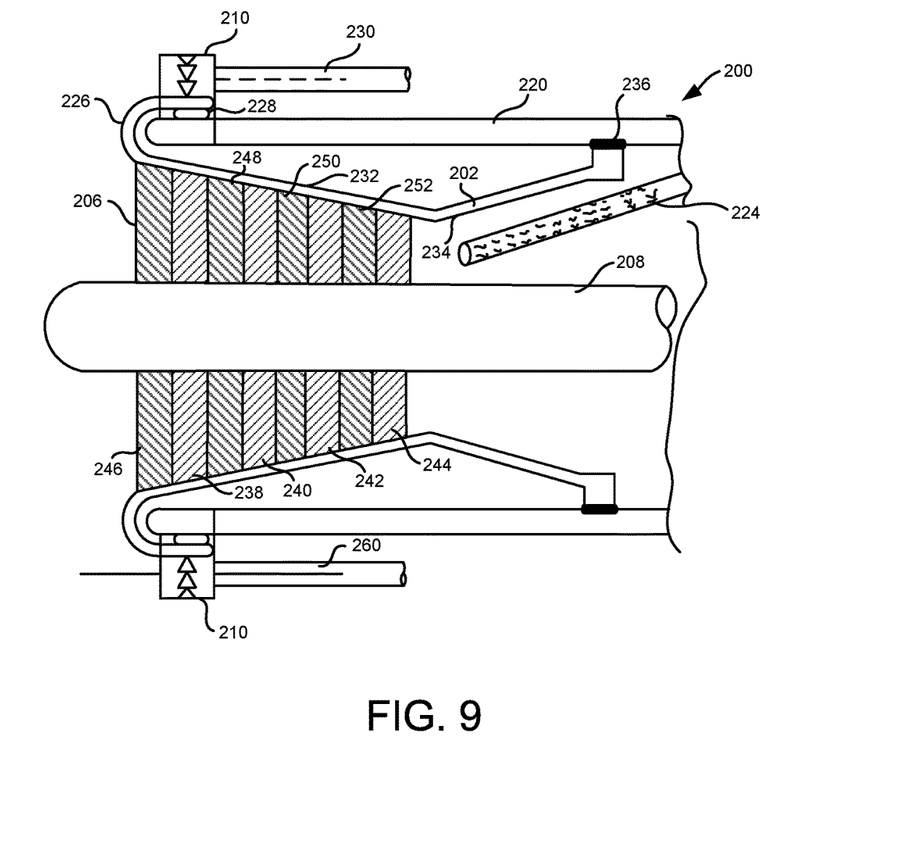
FIG. 9 is a cross-sectional view as taken across lines 9-9 of FIG. 8.

FIGS. 8 and 9 show the preferred embodiment of the power transmission system 200 of the present invention. In the previous embodiments of the power transmission system of the present invention, the bearings for the rotation of the barrels and shafts would be located in the fluid passageway within the turbine or compressor. Experiments have shown that the exposure of the bearings to the high temperature fluid flowing through the power transmission system of the present invention can cause deterioration and damage to the bearings. As such, in order to enhance the life of the power transmission system and to maintain the integrity of the bearings, the power transmission system 200 of the present invention was developed so as to isolate the bearings from the flow of hot gases and fluids.

In FIG. 8, an end view of the power transmission system and turbine 200 is particularly illustrated. In particular, there is a barrel 202 which has an open interior 204. Blades 206 are exposed through the opening 204 at the end of the barrel 202. At least some of the blades 206 radiate from a shaft 208. Other blades 206 will extend inwardly from the inner wall of the barrel 202. An energy transmitting system 210 is illustrated at various locations around the periphery of the barrel assembly 202. The energy transmission systems 210 are intended to cause the barrel assembly 202 to rotate. Alternatively, the power transmission system 210 can be used so as to transmit rotational energy as a result of the rotation of the barrel assembly 202. The power transmission can be gears, belts, chains or cog belts. Ultimately, as will be described hereinafter, a shaft is formed as part of the power transmission system 210.

FIG. 8 shows one arrow indicating one direction of rotation of the shaft 208. Another arrow 212 shows the counter-rotation of the barrel 202 and the blades associated therewith. As such, the blades 206 will be made up of rotating and counter-rotating blades, as will be described hereinafter.

FIG. 9 illustrates the unique configuration of the power transmission system 200 in association with counter-rotating blades. In particular, a housing 220 extends around a portion of the barrel assembly 202 and over the blades 206 and around the shaft 208. The housing 220 will surround a burner element 224. The burner element can be for a gas turbine. Fluid flow can flow into or out of the gas turbine depending on whether the power transmission system 200 is used in association with a compressor or a turbine element. It can be seen that the burner element 224 extends into the interior of the housing 224 for a distance.

The barrel 200 includes a first portion 226 which extends outwardly of an end of the housing 220 and back around so as to be mounted to a first set of bearings 228. As such, can be seen that the bearings 228 are located on the exterior of the housing 220. The power transmission 210 is illustrated as being joined to a second shaft 230. Transmission 210 will serve to transmit the rotation of the second shaft 230 into rotation of the barrel 202. Alternatively, the rotation of the barrel 202 can be utilized so as to cause rotation of the second shaft 230. In all circumstances, since the bearing set 228 is located on the exterior of the housing 220, it is isolated from the hot fluids flowing through the interior of the housing 220.

The barrel 202 includes a first portion 232 and a second portion 234. The curved end 226 of the barrel 202 extends to the first portion 232. The second portion 234 will extend back upwardly and rearwardly in the housing 220 to be mounted to a second bearing set 236. The second bearing set 236 is located at the inner wall of the housing 220 but rearwardly of the burner element 224. As such, this serves to isolate the bearing set 236 from the flow of hot gases within the interior of the housing 220. The bearing sets 228 and 236 will let the barrel 202 rotate. This rotation will cause certain blades affixed to the barrel assembly 202 to rotate counter to the direction of the blades attached to shaft 208.

It can be seen that blades 238, 240, 242 and 244 are mounted to the shaft 208. The blades 246, 248, 250 and 252 are affixed to the first portion 232 of the barrel 202. In other words, each blade of the blades affixed to the barrel 202 are interposed between adjacent blades that are affixed to the shaft 208. Since the shaft 208 rotates in a opposite direction to the rotation of the barrel 202, the various blades will counter-rotate with respect to each other so as to enhance the burning of gases within the interior of the housing 202 of the compressor or turbine assembly.

FIG. 9 further shows that there is an another transmission 210 located at the opposite side of the housing 202. Another shaft 260 is joined to the transmission 210. The shaft 230 and 260 can be utilized so as to cause the rotation of the barrel 202 are to transmit energy from the barrel 202.

By placing the transmissions 210 on the exterior of the housing 220 and the barrel assembly 202, the bearings 228 are effectively isolated from the heat on the interior of the housing 220. Furthermore, the shafts 230 and 260 are located at exterior of the housing 220 and, as such, will not suffer the adverse effects of heat applied thereto. Furthermore, the transmissions 210 are also located on the exterior of the housing 220 so as to be isolated from the flow of heat. If any maintenance or repair is necessary, then the transmissions 210, the shafts 230 and 260, and the bearings 228 are located at relatively easily accessible locations.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. An apparatus comprising:
   a housing having a fluid inlet or a fluid outlet passage;
   a first shaft rotatably mounted so as to be rotatable within said housing;
   a barrel rotatably mounted so as to be rotatable in an in a direction opposite to that of said first shaft within said housing;
   a first plurality of blades affixed to said first shaft extending radially outwardly therefrom, said first plurality of blades being in spaced relation to each other;
   a second plurality of blades affixed to said barrel and extending inwardly therefrom, each blade of said second plurality of blades being interposed between adjacent blades of said first plurality of blades;
   a first bearing set positioned on an exterior of said housing, said barrel having an end that is mounted on said first bearing set; and
   a second bearing set mounted on an inner wall of said housing in a location beyond the passage, said barrel having an opposite end mounted to said second bearing set.

2. The apparatus of claim 1, said barrel having an end portion extending over an end of said housing such that the end of said barrel fits onto said first bearing set.

3. The apparatus of claim 2, further comprising:
a second shaft rotatably mounted exterior of said housing.

4. The apparatus of claim 3, said second shaft engaging said end portion of said barrel such that a rotation of said second shaft causes a corresponding rotation of said barrel.

5. The apparatus of claim 4, said second shaft linked to said end portion of said barrel by a transmission, said transmission selected from the group consisting of gears, belts, chains and cogs belts.

6. The apparatus of claim 1, said housing having a first end and a second end, said first and second pluralities of blades decreasing in diameter from said first end toward said second end.

7. The apparatus of claim 6, said barrel having a first portion narrowing in inner diameter and a second portion expanding in inner diameter, the second plurality of blades being mounted on said first portion of said barrel.

8. The apparatus of claim 1, further comprising:
a power receiver positioned outwardly of said housing, said power receiver selected from the group consisting of a generator, a pump, a turbine and a compressor.

9. An apparatus comprising:
a housing having a fluid inlet passage or a fluid outlet passage;
a first shaft rotatably mounted so as to be rotatable in one direction within said housing;
a barrel rotatably mounted so as to the rotatable in a direction opposite to that of said first shaft within said housing;
a first plurality of blades affixed to said first shaft extending radially outwardly therefrom, said first plurality of blades being in spaced relation to each other;
a second plurality of blades affixed to said barrel and extending inwardly therefrom, each blade of said second plurality of blades being interposed between adjacent blades of said first plurality of blades;
a first bearing set positioned on or at an exterior area of said housing, said barrel having an end that is mounted on said first bearing set; and
a second bearing set mounted on an inner wall of said housing in a location beyond the fluid inlet passage or the fluid outlet passage, said barrel having an opposite end mounted to said second bearing set.

10. The apparatus of claim 9, said barrel having an end portion extending over an end of said housing such that the end of said barrel fits onto said first bearing set.

11. The apparatus of claim 10, further comprising:
a second shaft rotatably mounted exterior of said housing, said second shaft engaging said end portion of said barrel such that a rotation of said second shaft causes a corresponding rotation of said barrel.

12. The apparatus of claim 9, said housing having a first end and a second end, said first and second pluralities of blades decreasing in diameter from said first end toward said second end.

13. The apparatus of claim 12, said barrel having a first portion narrowing in inner diameter and a second portion expanding in inner diameter, the second plurality of blades being mounted on said first portion of said barrel.

14. An apparatus comprising:
a housing;
a first shaft rotatably mounted so as to be rotatable in one direction within said housing;
a barrel rotatably mounted so as to be rotatable in a direction opposite to that of said first shaft within said housing;
a first plurality of blades affixed to said first shaft and extending radially outwardly therefrom, said first plurality of blades being in spaced relation to each other;
a second plurality of blades affixed to said barrel and extending inwardly therefrom, each blade of said second plurality of blades being interposed between adjacent blades of said first plurality of blades; and
a second shaft rotatably mounted exterior of said housing so as to drive said barrel in rotation.

15. The apparatus of claim 14, further comprising:
a first bearing set positioned on an external area of said housing, said barrel having an end that is mounted on said first bearing set, said barrel having an end portion extending over an end of said housing such of the end of said barrel fits onto said first bearing set, said second shaft engaging said end portion of said barrel such that rotation of said second shaft causes a corresponding rotation of said barrel.

16. The apparatus of claim 14, said housing having a fluid inlet passage or a fluid outlet passage, the apparatus further comprising:
a second bearing set mounted on an inner wall of said housing in a location beyond the passage, said barrel having an opposite end mounted to said second bearing set.

17. The apparatus of claim 14, said housing having a first end and a second end, said first and second pluralities of blades decreasing in diameter from said first end toward said second end.

18. The apparatus of claim 17, said barrel having a first portion narrowing in inner diameter and a second portion expanding in inner diameter, the second plurality of blades being mounted on said first portion of said barrel.

* * * * *